United States Patent
Mizuno et al.

(10) Patent No.: US 10,773,587 B2
(45) Date of Patent: Sep. 15, 2020

(54) CAPSULE APPARATUS FOR POWER UNIT OF VEHICLE

(71) Applicant: SUBARU CORPORATION, Tokyo (JP)

(72) Inventors: Takako Mizuno, Tokyo (JP); Kensaku Tanaka, Tokyo (JP); Yoshio Iwakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/030,950

(22) Filed: Jul. 10, 2018

(65) Prior Publication Data

US 2019/0100097 A1 Apr. 4, 2019

(30) Foreign Application Priority Data

Sep. 29, 2017 (JP) .................. 2017-189308

(51) Int. Cl.
*B60K 11/06* (2006.01)
*B60K 11/08* (2006.01)
*B60K 13/02* (2006.01)
*B60K 13/04* (2006.01)

(52) U.S. Cl.
CPC ............ *B60K 11/06* (2013.01); *B60K 11/085* (2013.01); *B60K 13/02* (2013.01); *B60K 13/04* (2013.01)

(58) Field of Classification Search
CPC ...... B60K 11/06; B60K 11/085; B60K 13/02; B60K 13/04
See application file for complete search history.

(56) References Cited

U.S. PATENT DOCUMENTS

| 4,197,826 A | * | 4/1980 | Fachbach | F01P 11/12 123/198 E |
| 9,447,754 B1 | * | 9/2016 | Clarke | F02B 75/02 |
| 2013/0146376 A1 | * | 6/2013 | Nam | B60K 11/06 180/68.1 |
| 2015/0367748 A1 | * | 12/2015 | West | B60L 11/1872 318/139 |

FOREIGN PATENT DOCUMENTS

| GB | 284377 | * 10/1926 |
| JP | 2013-119384 A | 6/2013 |

* cited by examiner

*Primary Examiner* — Jacob M Amick
*Assistant Examiner* — Charles Brauch
(74) *Attorney, Agent, or Firm* — Troutman Pepper Hamilton Sanders LLP

(57) ABSTRACT

A capsule apparatus for a power unit of a vehicle is provided. The power unit is provided in a compartment of the vehicle and configured to combust air-fuel mixture in an engine body and discharge the combusted air-fuel mixture via an exhaust member. The capsule apparatus includes a capsule structure, an opening, an open-close member, and a controller. The capsule structure is configured to enclose at least the engine body, at least the exhaust member being provided outside the capsule structure. The opening of the capsule structure is provided near the exhaust member. The open-close member is configured to be movable to close the opening. The controller is configured to control opening and closing of the opening by the open-close member.

20 Claims, 5 Drawing Sheets

CAPSULE APPARATUS FOR POWER UNIT OF VEHICLE

CROSS-REFERENCE TO RELATED APPLICATIONS

The present application claims priority from Japanese Patent Application No. 2017-189308 filed on Sep. 29, 2017, the entire contents of which are hereby incorporated by reference.

BACKGROUND

1. Technical Field

The present invention relates to a capsule apparatus configured to enclose a power unit including an engine body of a vehicle such as an automobile.

2. Related Art

In the automobile industry, an electric automobile using a power unit including a battery and a motor has been developing in recent years. Realizing the practical use of the electric automobile depends on the progress of development. Therefore, now and in the near future, it is hard to imagine that an internal-combustion engine for combusting air-fuel mixture in an engine body is no longer in use in an automobile such as a hybrid automobile.

Conventionally, when an engine body for combusting air-fuel mixture is used in a power unit, it is required to improve the fuel economy performance. To address this, it has been proposed that an engine body is covered by a capsule structure, for example, in Japanese Unexamined Patent Application Publication (JP-A) No. 2013-119384. Here, the controller controls the front inlet of the capsule structure to close in initial start or a Key-Off state, and to open in the cooled state when the vehicle is driven. This closed capsule structure can keep the temperature of the engine body for a long time while the engine is stopped, and after that, the engine body which is kept warm can be restarted. The engine body is kept warm and restarted, and therefore it is possible to improve the fuel economy performance compared to when the cooled engine body is restarted.

SUMMARY OF THE INVENTION

An aspect of the present invention provides a capsule apparatus for a power unit of a vehicle. The power unit is provided in a compartment of the vehicle and configured to combust air-fuel mixture in an engine body and discharge the combusted air-fuel mixture via an exhaust member. The capsule apparatus includes: a capsule structure configured to enclose at least the engine body, at least the exhaust member being provided outside the capsule structure; an opening of the capsule structure provided near the exhaust member; an open-close member movable to close the opening; and a controller configured to control opening and closing of the opening by the open-close member.

An aspect of the present invention provides a capsule apparatus for a power unit of a vehicle. The power unit is provided in a compartment of the vehicle and configured to combust air-fuel mixture in an engine body and discharge the combusted air-fuel mixture via an exhaust member. The capsule apparatus includes: a capsule structure configured to enclose at least the engine body, at least the exhaust member being provided outside the capsule structure; an opening of the capsule structure provided near the exhaust member; an open-close member movable to close the opening; and circuitry configured to control opening and closing of the opening by the open-close member.

DETAILED DESCRIPTION

Figure 1A:
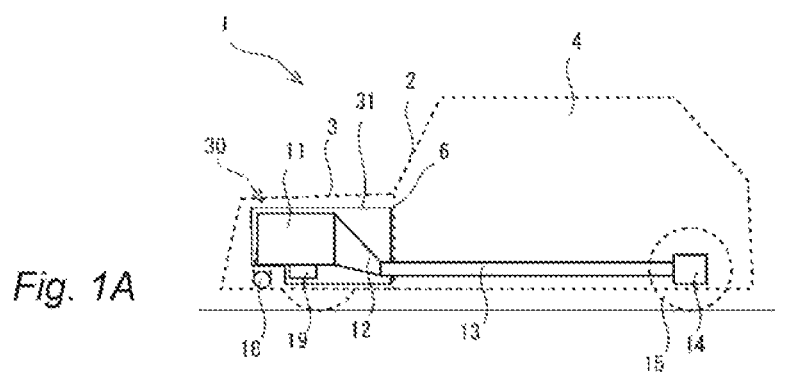
FIGS. 1A-1B illustrates a vehicle according to an example of the present invention.

Hereinafter, an example of the present invention will be described with reference to the drawings. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example which are not recited in a most-generic independent claim of the present invention are optional and may be provided on an as-needed basis. The drawings are schematic and are not intended to be drawn to scale. Throughout the present specification and the drawings, elements having substantially the same function and configuration are denoted with the same reference numerals to avoid any redundant description.

In JP-A No. 2013-119384, when the engine is restarted, the capsule structure is closed until the engine body is properly warmed up in the same way as when the engine body is stopped. Therefore, the engine body covered with the capsule structure is warmed up only by its heat.

It is desirable to provide a capsule apparatus for a power unit including an engine body for combusting air-fuel mixture in a vehicle such as an automobile, which is capable of improving the fuel economy performance in practical use.

Figure 1B:
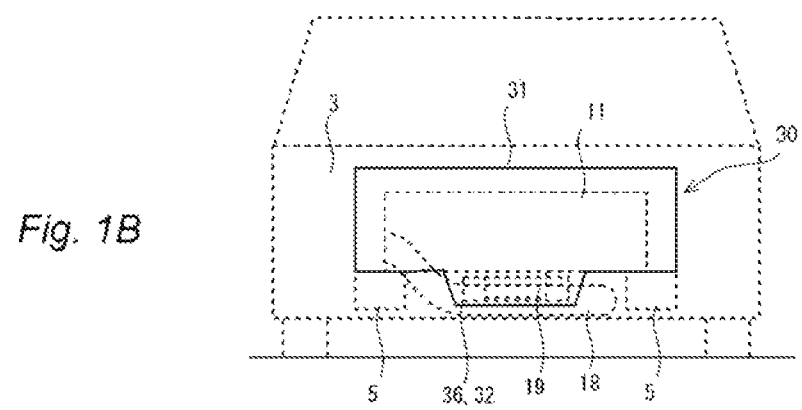

FIGS. 1A-1B illustrate an automobile 1 according to an example of the present invention. The automobile 1 is an example of vehicles. FIG. 1A is a schematic side perspective view illustrating the automobile 1. FIG. 1B is a schematic front perspective view illustrating the automobile 1.

The automobile 1 illustrated in FIGS. 1A-1B includes a vehicle body 2. A front compartment 3 is provided in the front part of the vehicle body 2. A pair of front beams 5, as a framework member of the automobile 1, extends in the front compartment 3. In addition, a toe board 6, as a partition wall (structural member), is provided between the front compartment 3 and a passenger compartment 4. A power unit including an engine body 11, a transmission 12, and so forth is disposed in the front compartment 3. In addition, a propeller shaft 13 is provided under the floor of the vehicle body 2 to extend from the front compartment 3 to the back of the vehicle body 2. A rear differential gearbox 14 is provided at the rear end of the propeller shaft 13 and coupled to a rear axle and a rear wheel 15. The engine body 11 ignites and combusts air-fuel mixture of gasoline and the air introduced through an air cleaner 16 and an induction pipe 17 in a combustion chamber, moves a piston down with an expanding pressure of the combusted air-fuel mixture, and rotates an output axis coupled to the piston. In addition, the combusted air-fuel mixture is discharged to the outside through an open exhaust valve and an exhaust pipe 18. A rotary drive force of the output shaft generated by the engine body 11 is reduced by the transmission 12, and transmitted to the rear wheel 15 through the propeller shaft 13, the rear differential gearbox 14, and a rear axle shaft. Then, part of the rotary drive force is divided by the transmission 12, and transmitted to a front wheel 15 through a front axle shaft (not illustrated).

In the automobile industry, an electric automobile using a power unit including a battery and a motor has been developing in recent years. Realizing the practical use of the electric automobile depends on the progress of development. Therefore, now and in the near future, it is hard to imagine that an internal-combustion engine for combusting air-fuel mixture in the engine body 11 is no longer in use in the automobile 1 such as a hybrid automobile. Thus, the internal-combustion engine that combusts air-fuel mixture in the engine body 11 will be required to improve the fuel economy performance in the future. Also, the power unit including the engine body 11 is required to improve the fuel economy performance in practical use.

Figure 2:
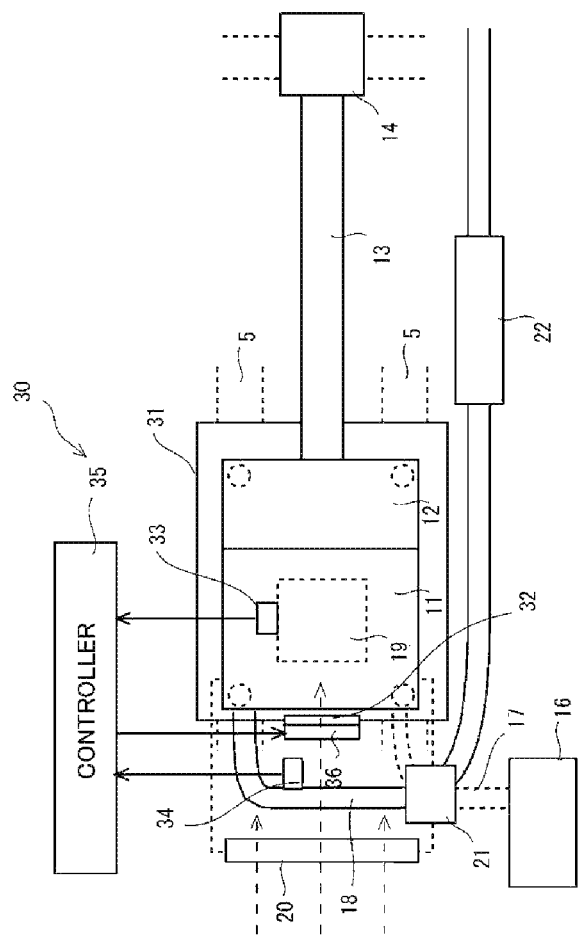
FIG. 2 illustrates a power unit and a capsule apparatus provided in the vehicle illustrated in FIG. 1.

FIG. 2 illustrates a power unit and a capsule apparatus 30 provided in the automobile 1 illustrated in FIG. 1.

FIG. 2 illustrates a power unit provided in the automobile 1, which includes the engine body 11, an oil pan 19, a radiator 20, the air cleaner 16, the induction pipe 17, the exhaust pipe 18, a turbomachinery 21, a catalytic machinery 22, the transmission 12, the propeller shaft 13, and the rear differential gearbox 14. The oil pan 19 is provided under the engine body 11 and integrally formed with the engine body 11. The engine body 11 and the transmission 12 are lubricated with oil. The radiator 20, the air cleaner 16, the induction pipe 17, the exhaust pipe 18, the turbomachinery 21, and the catalytic machinery 22 are engine accessories for use with the engine body 11. In addition, engine accessories include, for example, an electric generator, a battery, a distributor, an injector, a fuel tank, and a pump (not illustrated). These engine accessories are used with the engine body 11 to assist the operation of the engine body 11 to maintain the state of the engine body 11 within an appropriate range for the combustion.

Figure 3A:
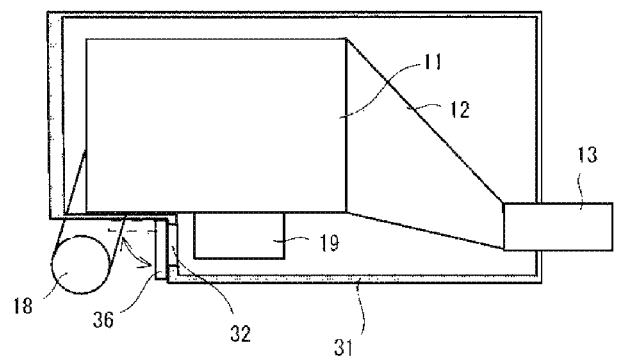
FIGS. 3A-3B illustrates the detailed configuration of the capsule apparatus illustrated in FIG. 2.
Figure 3B:
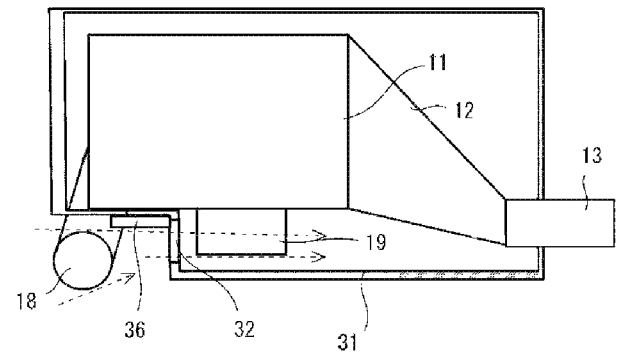

The capsule apparatus 30 illustrated in FIG. 2 is configured to enclose the power unit including the engine body 11. FIGS. 3A-3B illustrate the detailed configuration of the capsule apparatus 30 illustrated in FIG. 2. The capsule apparatus 30 includes a casing 31, an opening 32, an internal temperature sensor 33, an external temperature sensor 34, a controller 35, and an open-close member 36.

The casing 31 has an approximately boxy shape, and encloses the engine body 11 integrally formed with the oil pan 19 and the transmission 12 of the power unit. The casing 31 is made of, for example, a heat insulating material. The casing 31 has a box shape which is one size larger than a size to accommodate the engine body 11 and the transmission 12. In order to secure the seal of the casing 31, a boot (not illustrated) which is made of, for example, a rubber material or a resin material, is provided around the propeller shaft 13, the induction pipe 17, and the exhaust pipe 18 protruding outward from the casing 31. By this means, the casing 31 hermetically encloses the engine body 11 and the transmission 12 while providing an air layer around the engine body 11 and the transmission 12. The casing 31 also encloses the injector and the oil pan 19 provided in the engine body 11. Meanwhile, approximately the entire exhaust pipe 18, the turbomachinery 21, the catalytic machinery 22, the air cleaner 16, and approximately the entire induction pipe 17 are provided outside the casing 31. Here, the engine accessories such as the electric generator, the battery, the distributor, the fuel tank, and the pump may be provided inside or outside the casing 31. As illustrated in FIG. 1, the casing 31 is disposed in the front compartment 3 where the engine body 11 is placed on the casing 31, and the casing 31 and the engine body 11 are mounted to and supported by the pair of front beams 5 of the vehicle body 2 at the same positions. As illustrated in FIG. 1B, the casing 31 is provided not to protrude downward from the pair of front beams 5. By this means, the minimum ground clearance of the vehicle body 2 is the same as that when the casing 31 is not provided.

As illustrated in FIGS. 3A-3B, the opening 32 is formed in the lower part of the front of the casing 31. The exhaust pipe 18 is provided to pass the front side of the oil pan 19 under the engine body 11. By this means, the opening 32 of the capsule structure is located between the oil pan 19 and the exhaust pipe 18.

The open-close member 36 is integrally attached to the casing 31 outside the upper part of the opening 32. The open-close member 36 attached to the casing 31 is configured to pivot up. In FIG. 3A, the open-close member 36 is pivoted down. In this state, the opening 32 of the casing 31 is closed. The casing 31 is sealed, and therefore the space inside the casing 31 can be isolated from the outside. In FIG. 3B, the open-close member 36 is pivoted up. In this state, the opening 32 of the casing 31 is open. The opening 32 allows communication between the inside and the outside of the casing 31. In this way, the open-close member 36 is pivotally attached to the casing 31 outside the upper part of the opening 32. Therefore, it is possible to prevent the open-close member 36 from protruding downward from the casing 31. As illustrated in FIG. 1, the open-close member 36 is provided not to protrude downward from the pair of front beams 5 of the vehicle body 2.

The internal temperature sensor 33 is disposed in the casing 31 and detects the temperature of the inside of the casing 31. Here, the internal temperature sensor 33 is provided to contact the outer surface of the oil pan 19. Therefore, the internal temperature sensor 33 can detect the temperature of the oil pan 19, or the oil circulating through the engine body 11, as the temperature of the inside of the casing 31 of a capsule structure.

The external temperature sensor 34 is disposed outside the casing 31 and detects the temperature of the outside of the casing 31. Here, the external temperature sensor 34 is provided on the exhaust pipe 18 near the front of the opening 32. Therefore, the external temperature sensor 34 can detect the temperature of the exhaust pipe 18, or the temperature of the warmed air around the exhaust pipe 18, as the temperature of the outside of the casing 31 of the capsule structure. The internal temperature sensor 33, the external temperature sensor 34, and the open-close member 36 are coupled to the controller 35. The controller 35 controls the opening and closing of opening 32 by the open-close member 36, based on the correlation between the internal temperature and the external temperature of the casing 31 detected by the internal temperature sensor 33 and the external temperature sensor 34, respectively. The controller 35 may be implemented by, for example, a microcomputer. The controller 41 may be mounted to the casing 31 as a dedicated circuit, or provided as a function of an ECU (engine control unit) that controls the automobile 1.

Figure 4:
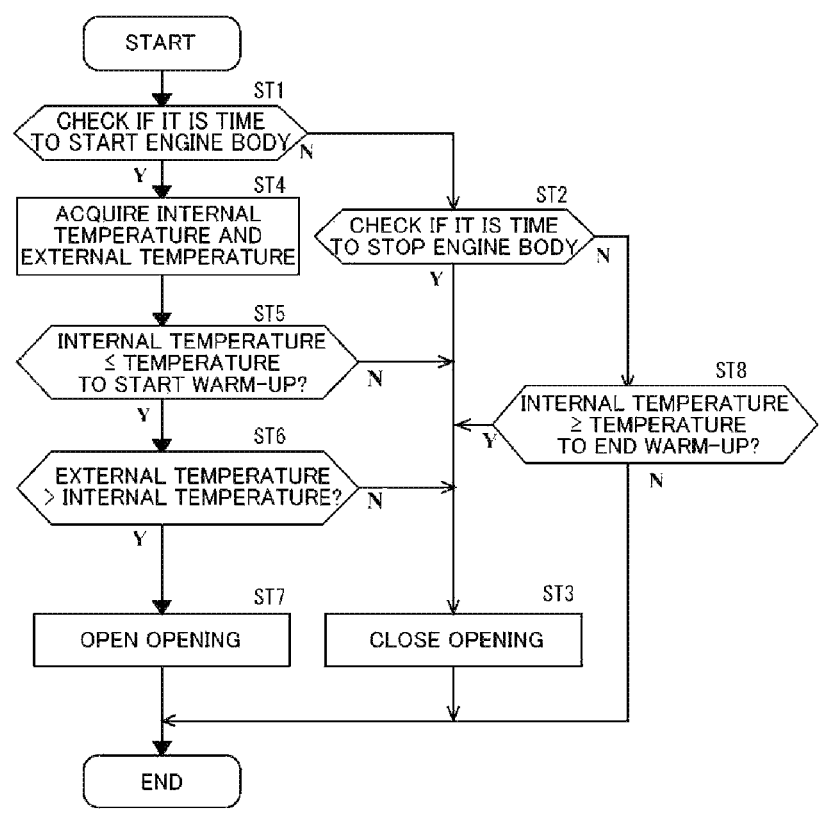
FIG. 4 is a flowchart illustrating a process to control the opening and closing performed by a controller illustrated in FIG. 2.

FIG. 4 is a flowchart illustrating a process to control the opening and closing of the opening 32 performed by the controller 35. The controller 35 repeatedly performs the process to control the opening and closing illustrated in FIG. 4.

In the process illustrated in FIG. 4, the controller 35 first checks if it is a time to start the engine body 11 (step ST1). The controller 35 acquires information on the control of the engine body 11 by the ECU, and checks if it is a time to start the engine body 11. The time to start the engine body 11 may be, for example, within several tens of minutes from when the engine body 11 is started.

Here, when determining that it is not a time to start the engine body, the controller 35 determines whether it is a time to stop the engine body 11 (step ST2). Recently, the operation of the engine body 11 is switched between the start and the stop by operating an ignition key or a starting switch of the automobile 1. When the automobile 1 is stopped, the engine body 11 is stopped for a period of time until an accelerator pedal is operated next according to the control of the ECU. The engine body 11 may be stopped at the above-described time. When determining that it is a time to stop the engine body 11, the controller 35 closes the opening 32 (step ST3). By this means, the casing 31 is sealed. The inside of the casing 31 is kept warm by the heat-insulation structure. When determining that it is a time neither to start nor stop the engine body 11, the controller 35 basically does not perform the process to control the opening and closing, but ends the process illustrated in FIG. 4.

When determining that it is a time to start the engine body 11, the controller 35 acquires the internal temperature and the external temperature of the casing 31, from the internal temperature sensor 33 and the external temperature sensor 34, respectively (step ST4). Then, the controller 35 compares the internal temperature to a temperature to start warm-up (step ST5). The temperature to start warm-up may be a minimum temperature suitable to drive, for example, the engine body 11 and the transmission 12. To be more specific, for example, the temperature to start warm-up may be a temperature at which the viscosity of the oil used in the engine body 11 and the transmission 12 is higher than a desired viscosity suitable to drive the engine body 11 and the transmission 12. When the internal temperature is higher than the temperature to start warm-up, the controller 35 determines to close the opening 32 (step ST3). By this means, the opening 32, which has been closed before and since the engine body 11 is started, is kept closed.

On the other hand, when determining that the internal temperature is equal to or lower than the temperature to start warm-up, the controller 35 compares the internal temperature to the external temperature (step ST6). The external temperature means the temperature of the exhaust pipe 18, or the temperature of the outside air around the exhaust pipe 18. When the cooled engine body 11 is started, the temperature of the exhaust pipe 18 tends to increase before the temperature of the engine body 11 increases. When the external temperature just after the engine body 11 is started is low like the internal temperature, the temperature of the exhaust pipe 18 is also low like the engine body 11. In this case, the controller 35 determines that the external temperature is not higher than the internal temperature. The controller 35 determines to close the opening 32 (step ST3). By this means, the opening 32, which has been closed before and since the engine body 11 is started, is kept closed.

In contrast, when the temperature of the exhaust pipe 18 starts to increase because the combusted air-fuel mixture is discharged, the controller 35 determines that the external temperature is higher than the internal temperature. The controller 35 opens the opening 32 (step ST7). By this means, the opening 32, which has been closed before and since the engine body 11 is started, is open. When the opening 32 opens, the outside air warmed by the exhaust pipe 18 of a high temperature flows into the casing 31 via the opening 32, as illustrated in FIG. 3B. By this means, the cooled engine body 11 and the transmission 12 are warmed by part of the heat of the combusted air-fuel mixture being discharged, as well as their own heat.

After that, when the temperatures of the engine body 11 and the transmission 12 increase, the controller 35 compares the internal temperature to a temperature to end warm-up in the step ST8, and determines that the internal temperature is higher than the temperature to end warm-up. The controller 35 determines to close the opening 32 (step ST3). By this means, the opening 32 which is open to warm up the engine body 11 and so forth is closed. Accordingly, it is possible to prevent the outside air heated by the exhaust pipe 18 from contributing to an increase in the temperatures of the engine body 11 and the transmission 12 which are properly warmed up.

With the present example as described above, in the automobile 1 including the power unit, the casing 31 of the capsule structure encloses at least the engine body 11 of the power unit while providing an air layer between the casing 31 and the engine body 11. The casing 31 has the opening 32 formed near the exhaust pipe 18 located outside the casing 31, and the opening and closing of the opening 32 by the open-close member 36 is controlled depending on the state of the automobile 1. Therefore, it is possible to close the opening 32 depending on the state of the automobile 1. It makes it difficult to change the temperature of the engine body 11 inside the capsule structure. For example, the opening 32 is closed by the open-close member 36 while the automobile 1 or the power unit is stopped. By this means, it is possible to keep the temperature of the stopped engine body 11 for a long time, and then to restart the engine body 11 kept warm. Since the engine body 11 kept warm is restarted, it is possible to exert a desired engine performance just after the restart. The fuel economy of the engine body 11 generally may be decreased for a period of time until the temperature of the cooled engine body 11 is increased to an appropriate temperature by the warm-up. However, with the present example, it is possible to solve this problem and improve the fuel economy performance in practical use. In addition, it is possible to open the opening 32 depending on the state of the automobile 1. By this means, it is possible to supply the air warmed by the exhaust pipe 18 to the engine body 11 inside the capsule structure. The controller 35 controls the opening and closing of the opening 32 by the open-close member 36, based on, for example, the correlation between the internal temperature which is the temperature of the power unit including the engine body 11 or the inside of the capsule structure and the external temperature which is the temperature of the exhaust pipe 18 outside the capsule structure or the temperature around the exhaust pipe 18. When the internal temperature is a temperature at which the engine body 11 or the power unit needs to be warmed up, the open-close member 36 opens the opening 32 in a case that the external temperature is higher than the internal temperature. By this means, it is possible to introduce the outside air warmed by the exhaust pipe 18 discharging the combusted air-fuel mixture of a high temperature into the capsule structure to warm the cooled engine body 11. It is possible to promptly warm up the engine body 11 to restart the engine body 11 by using the heat of the exhaust pipe 18 which has been heated to a significantly high temperature before the engine body 11 is warmed.

As described above, with the present example, it is possible to promptly increase the temperature of the power unit including the engine body 11 to a temperature suitable to drive the power unit, and maintain the temperature, by using not only the heat of the engine body 11 but also the exhaust heat. By this means, it is possible to improve the fuel economy in practical use. Moreover, at least the exhaust pipe 18 is provided outside the capsule structure. By this means, it is possible to prevent the temperature of the inside of the closed capsule structure from being abnormally increased due to the exhaust heat, as compared to when the exhaust pipe 18 and so forth are enclosed by the capsule structure. In addition, it is possible to prevent a negative effect on resin or rubber parts used as an air intake exhaust system of the engine body 11 and mounts or cover members for the engine body 11.

With the present example, the opening 32 is opened and closed based on the internal temperature of the oil in the engine body 11 or the internal temperature of the oil pan 19 containing the oil. To be more specific, when the internal temperature is equal to or lower than the temperature to start warm-up, the opening 32 is opened while the external temperature is higher than the internal temperature, so that it is possible to promptly warm the oil in the engine body 11 by using the exhaust heat. Meanwhile, when the internal temperature is equal to or higher than the temperature to end warm-up, the opening 32 is closed regardless of the relationship between the external temperature and the internal temperature. By this means, it is possible to prevent the oil properly warmed in the engine body 11 from being overheated by the exhaust heat. In addition, it is possible to efficiently and promptly warm the oil in the engine body 11 to an appropriate temperature, and maintain the temperature.

With the present example, the exhaust pipe 18 is provided to pass the front side of the engine body 11 or the oil pan 19 in the automobile 1, and the opening 32 of the casing 31 of the capsule structure is provided between the engine body 11 or the oil pan 19 and the exhaust pipe 18. Therefore, when the automobile 1 is being driven by starting the engine body 11, it is possible to effectively use the airflow warmed by the heat of the exhaust pipe 18 of an extremely high temperature to warm the engine body 11 and the oil pan 19.

With the present example, the open-close member 36 is integrally attached to the casing 31 of the capsule structure. Therefore, there is no need to mount the open-close member 36 to the framework member or the structural member of the automobile 1 to support the open-close member 36. By this means, it is possible to simplify the capsule structure.

With the present example, in the front compartment 3 of the automobile 1, the casing 31 of the capsule structure is provided to enclose at least the engine body 11. The engine body 11 is placed on the casing 31, and the casing 31 and the engine body 11 are mounted to and supported by the framework member or the structural member of the automobile 1 at the same positions. Therefore, there is no need to mount the components of the capsule structure to the framework member or the structural member of the automobile 1 because the casing 31 of the capsule structure is integrally mounted to the power unit such as the engine body 11. Accordingly, for example, compared to a case where the capsule structure is constituted by casings such as an engine cover and a bottom cover which are individually mounted to the framework member or the structural member of the automobile 1, there is no need to add a complicated process or make a significant change to mount the capsule structure to the automobile 1. In addition, it is possible to form the capsule structure in a minimum size, and therefore to manufacture the capsule structure at low cost. Moreover, the open-close member 36 provided outside of the capsule structure is movable to fall inside the framework member or the structural member of the automobile 1. By this means, it is possible to provide the capsule structure in the automobile 1 without a significant impact on the specification of the automobile 1, such as the minimum ground clearance of the vehicle body 2.

While the above-described examples are preferred examples of the present invention, it is to be understood that the invention is not limited to these examples. The present invention is intended to cover various modification and alteration without departing from the spirit and scope of the present invention.

With the above-described example, the automobile 1 includes the power unit including engine body 11 of an internal-combustion engine. However, this is by no means limiting, but the automobile 1 may be a hybrid automobile including an electric drive apparatus with a motor as well as the internal-combustion engine, or an electric automobile including the electric drive apparatus without the internal-combustion engine.

Figure 5:
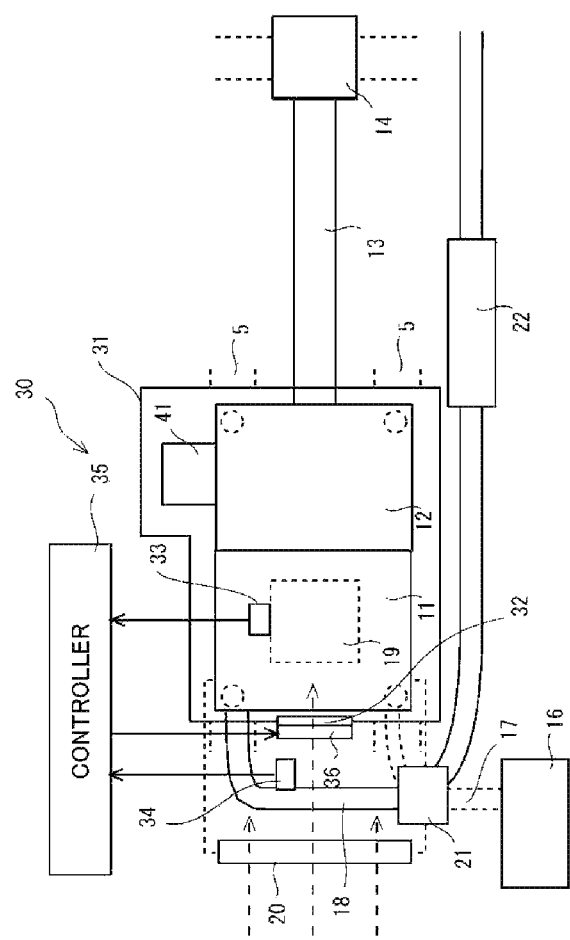
FIG. 5 illustrates a power unit and a capsule apparatus for a hybrid automobile.

FIG. 5 illustrates the power unit and the capsule apparatus 30 in a hybrid automobile. In FIG. 5, an electric motor 41 is mounted to the transmission 12. A plurality of electric cells are coupled to the electric motor 41 via a converter (not illustrated). The electric motor 41 is driven to transmit a driving force to the propeller shaft 13 via the transmission 12. For this type of power unit, the casing 31 of the capsule apparatus 30 may enclose the electric motor 41 and the converter as hybrid automobile components, as well as the engine body 11, the engine accessories, and the transmission 12. In this case, it is possible to warm the electric motor 41 and the converter to have a frictional resistance and so forth which are suitable to drive the electric motor 41 and the converter. In addition, the inside of the casing 31 may be divided into two sections, and the engine body 11 and so forth may be disposed in one section, and the hybrid automobile components may be disposed in the other section. In this case, it is possible to individually keep the sections warm at different temperatures.

With the above-described example, it is determined that the engine body 11 is stopped until the accelerator pedal is operated from when the automobile 1 is stopped. In addition, for example, in a case in which the engine body 11 is at least being driven but temporarily stopped when the automobile 1 is stopped, it may be determined that the engine body 11 is driven but not stopped. In this case, the opening 32 remains open. By this means, it is possible to prevent the temperature of the engine body 11 from significantly increasing when the automobile 1 is stopped for a short time while the engine body 11 is being driven.

The invention claimed is:

1. A capsule apparatus for a power unit of a vehicle, the power unit being provided in a compartment of the vehicle and configured to combust air-fuel mixture in an engine body and discharge the combusted air-fuel mixture via an exhaust member, the capsule apparatus comprising:
   a capsule structure including a casing member that is configured to entirely enclose at least the engine body by the casing member, at least a part of the exhaust member being located outside of the casing member;

an opening formed in the casing member and located between an oil pan of the engine body and the part of the exhaust member located outside of the casing member;

a door movable to close the opening; and a controller configured to control opening and closing of the opening by the door, wherein the oil pan of the engine body is configured to face the opening, and wherein the part of the exhaust member located outside of the casing member is configured to face the opening.

2. The capsule apparatus according to claim 1, wherein the controller controls the door to close the opening when the vehicle or the power unit is stopped excepting the vehicle is temporarily stopped while the power unit is being driven.

3. The capsule apparatus according to claim 1, wherein the controller controls the opening and closing of the opening by the door, on a basis of correlation between a first temperature of the engine body, the power unit or an inside of the capsule structure and a second temperature of the exhaust member located outside the capsule structure or a vicinity of the exhaust member.

4. The capsule apparatus according to claim 1, wherein when a first temperature is a temperature at which the engine body or the power unit needs to be warmed up, the door opens the opening in a case that a second temperature is higher than the first temperature.

5. The capsule apparatus according to claim 1, wherein:
the controller acquires a temperature of oil in the engine body or an oil pan containing the oil as a first temperature;
the controller controls the door to open the opening when the first temperature is equal to or lower than a temperature to start warm-up while a second temperature is higher than the first temperature; and
the controller controls the door to close the opening when the first temperature is equal to or higher than a temperature to end warm-up.

6. The capsule apparatus according to claim 1, wherein the door is integrally formed with a casing of the capsule structure.

7. The capsule apparatus according to claim 1, wherein:
the capsule structure comprises a casing configured to enclose at least the engine body in the vehicle; and
the casing and the engine body are configured to attached to and supported by a frame member or a structural member of the vehicle.

8. The capsule apparatus according to claim 1, wherein the door provided outside the capsule structure is located inside a frame member or a structural member of the vehicle.

9. The capsule apparatus according to claim 1, wherein the capsule structure encloses components including at least the engine body which are lubricated with oil in the vehicle.

10. The capsule apparatus according to claim 1, wherein:
the engine body, an engine accessory, a transmission, and a hybrid automobile component are provided in the vehicle; and
the capsule structure encloses at least the engine body.

11. The capsule apparatus according to claim 1, wherein an exhaust pipe, a turbomachinery, a muffler, and a catalytic machinery of the power unit are provided outside the capsule structure in the vehicle.

12. A capsule apparatus for a power unit of a vehicle, the power unit being provided in a compartment of the vehicle and configured to combust air-fuel mixture in an engine body and discharge the combusted air-fuel mixture via an exhaust member, the capsule apparatus comprising:

a capsule structure including a casing member that is configured to entirely enclose at least the engine body by the casing member, at least a part of the exhaust member being located outside of the casing member;

an opening formed in the casing member and located between an oil pan of the engine body and the part of the exhaust member located outside of the casing member;

a door movable to close the opening; and circuitry configured to control opening and closing of the opening by the door, wherein the oil pan of the engine body is configured to face the opening, and wherein the part of the exhaust member located outside of the casing member is configured to face the opening.

13. The capsule apparatus according to claim 1, wherein the casing member has an approximately boxy shape made of a heat insulating material.

14. The capsule apparatus according to claim 13, wherein the casing member has a box shape larger than a size to accommodate at least an engine body and a transmission included in the power unit, and a rubber material or a resin material is provided around a propeller shaft, an induction pipe, and an exhaust pipe protruding outward from the casing member.

15. The capsule apparatus according to claim 1, wherein the capsule structure is configured to enclose the engine body integrally formed with the oil pan and a transmission of the power unit by the casing member.

16. The capsule apparatus according to claim 1, wherein the part of the exhaust member located outside of the casing member is configured to be aligned with the oil pan of the engine body through the opening.

17. The capsule apparatus according to claim 1, wherein the part of the exhaust member located outside of the casing member and the oil pan of the engine body is configured to be located in a same straight line through the opening.

18. The capsule apparatus according to claim 1, wherein the part of the exhaust member located outside of the casing member is configured to be placed in a position to look at the oil pan of the engine body through the opening.

19. The capsule apparatus according to claim 1, wherein the door is located between the oil pan integrally formed with the engine body and the part of the exhaust member outside of the casing member.

20. The capsule apparatus according to claim 1, wherein the exhaust member includes a lateral portion that extends in a lateral direction of the vehicle, and wherein the opening or the movable door is located between the oil pan and the lateral portion of the exhaust member.

* * * * *